W. MORRISON.
POWER TRANSMISSION SYSTEM.
APPLICATION FILED SEPT. 15, 1914.
1,148,788.
Patented Aug. 3, 1915.
4 SHEETS—SHEET 1.
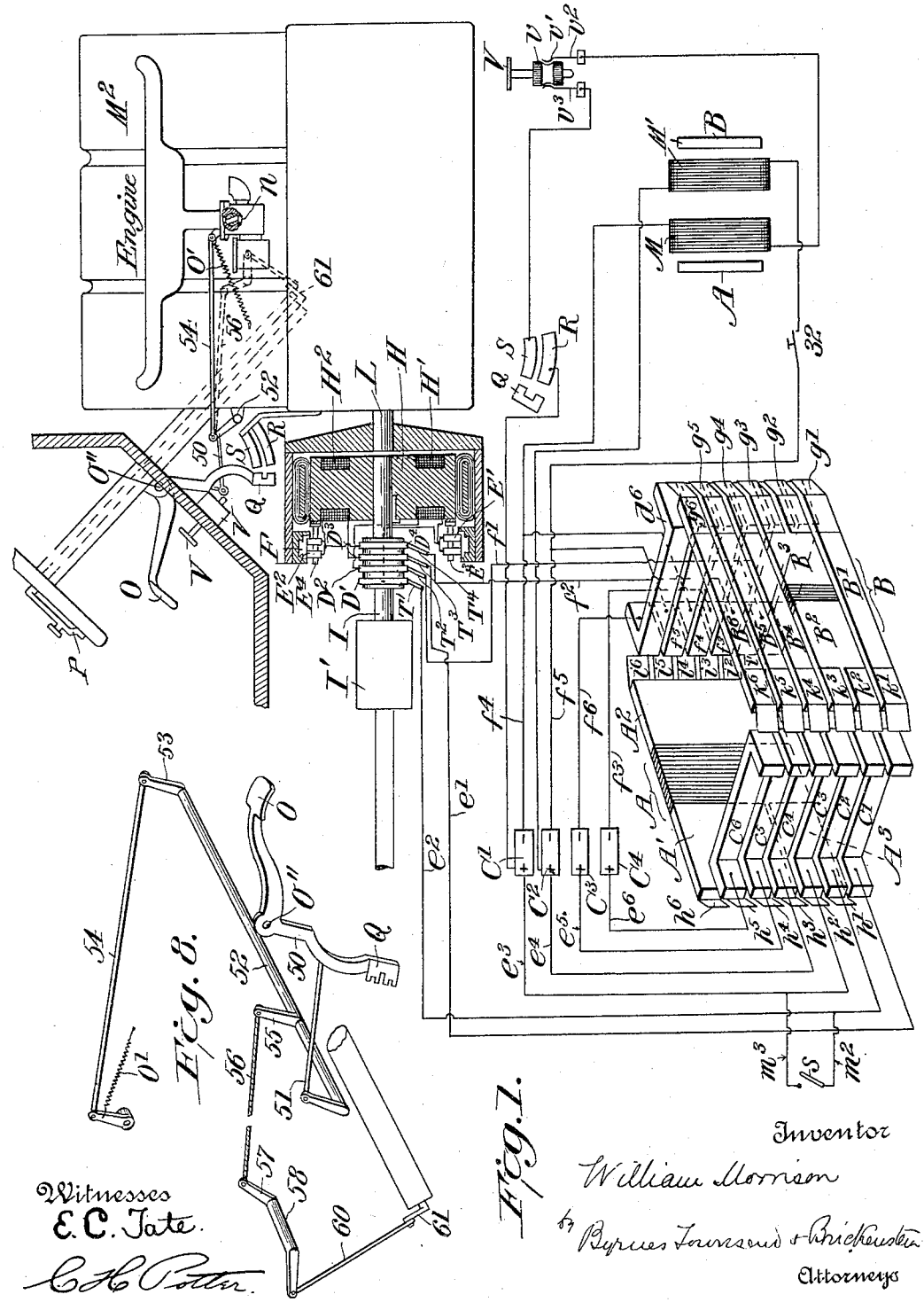
Witnesses
E. C. Tate.
C. H. Potter.
Inventor
William Morrison
by Byrnes Townsend & Brickenstein
Attorneys

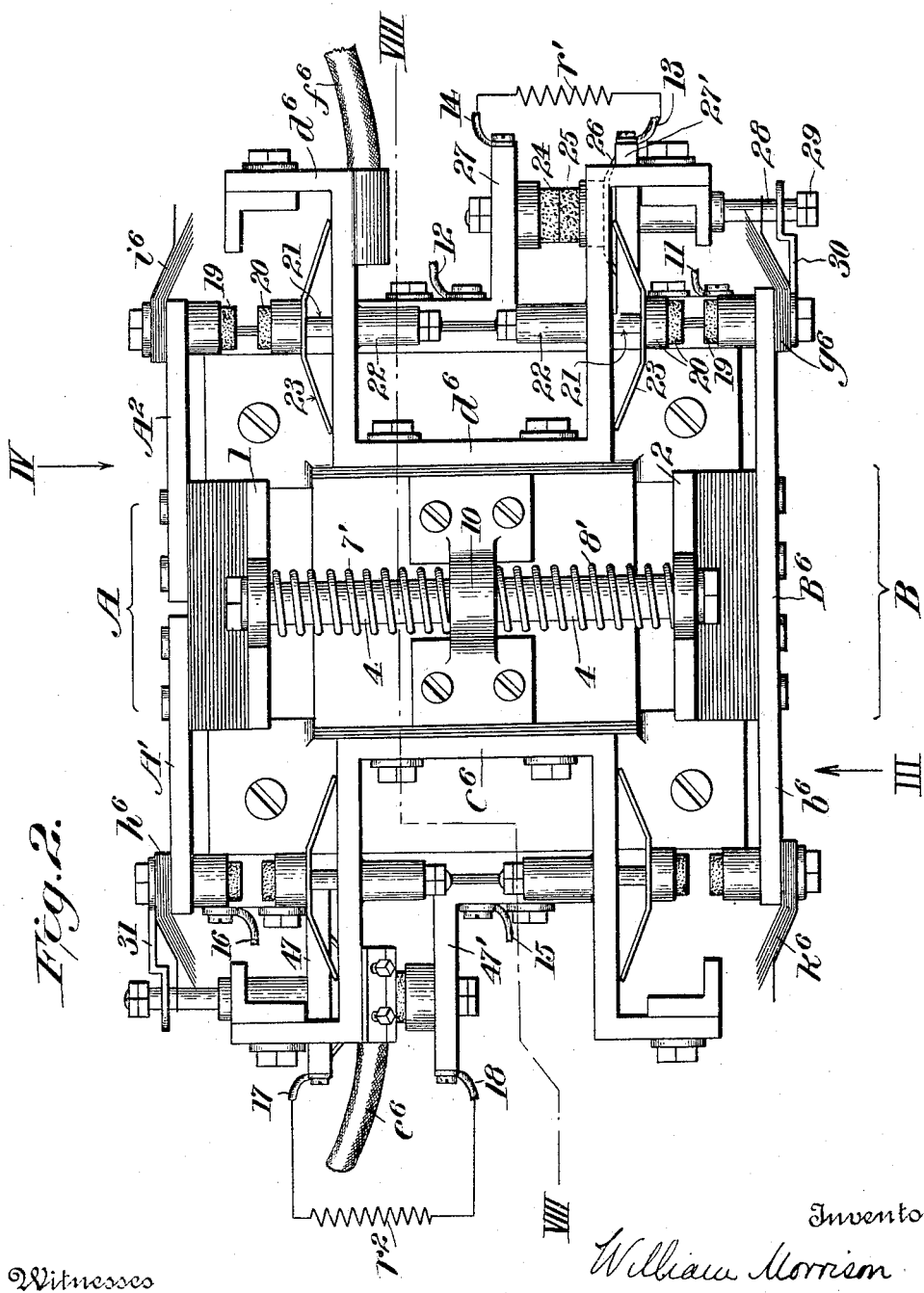

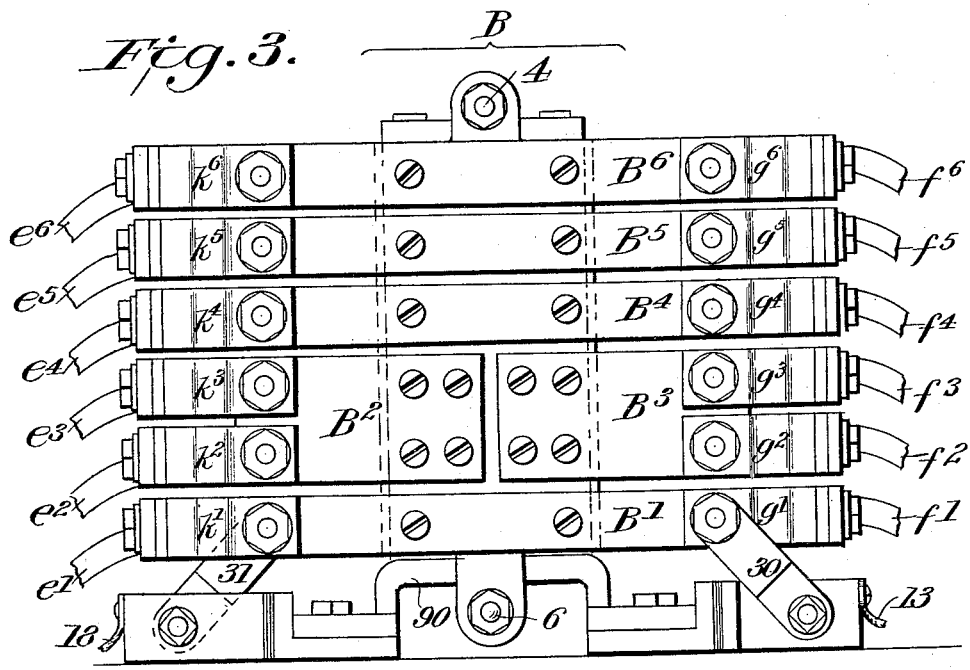
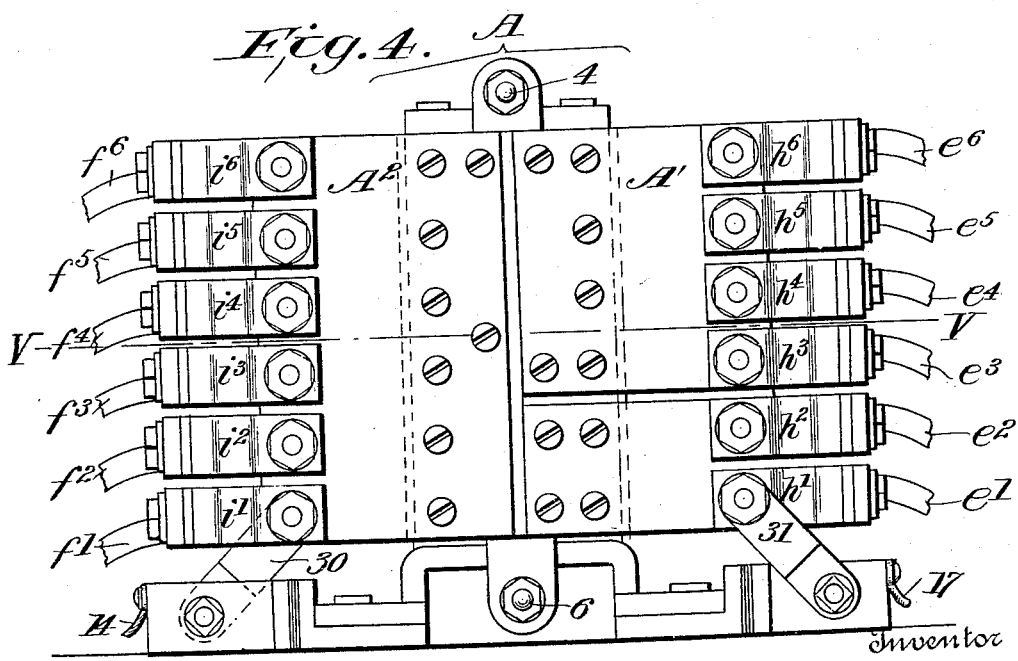

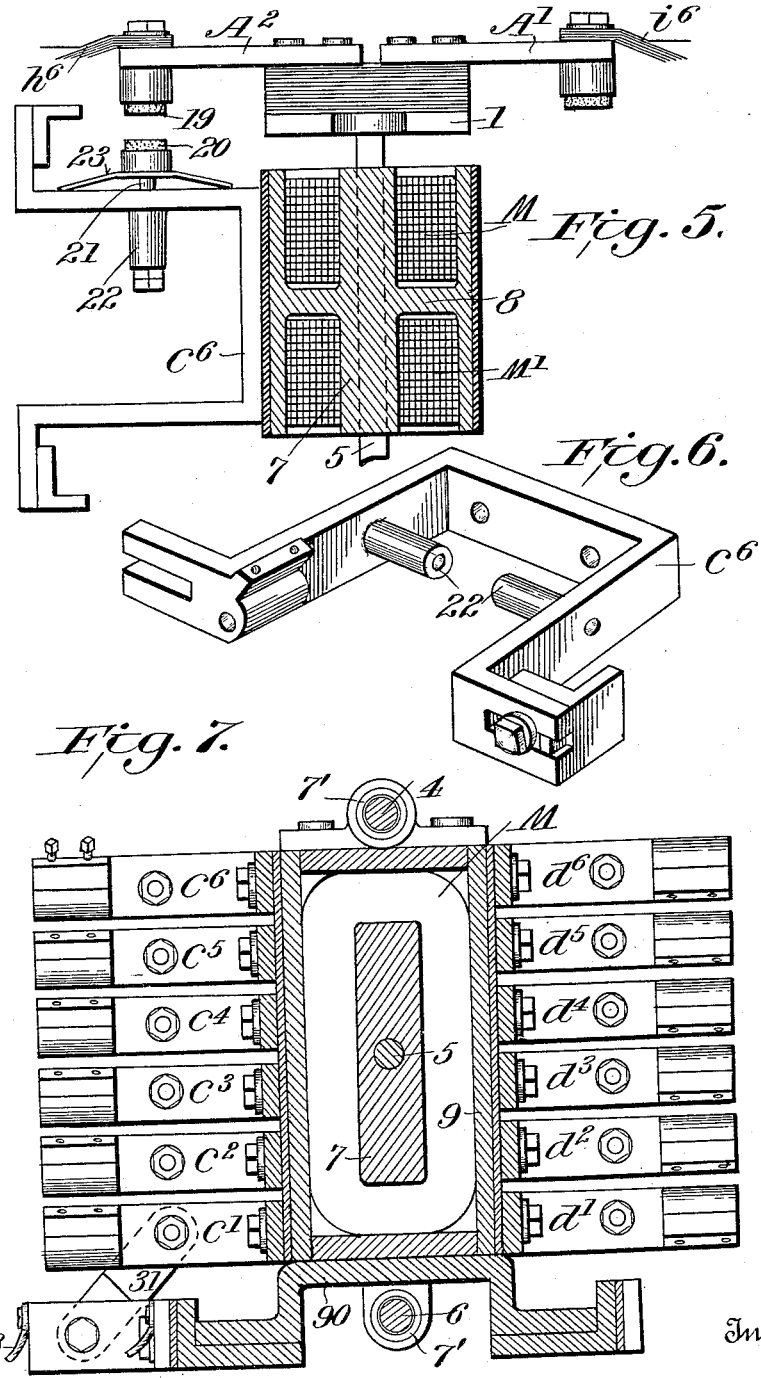

UNITED STATES PATENT OFFICE.

WILLIAM MORRISON, OF DES MOINES, IOWA.

POWER-TRANSMISSION SYSTEM.

1,148,788.  Specification of Letters Patent.  Patented Aug. 3, 1915.

Application filed September 15, 1914. Serial No. 861,770.

*To all whom it may concern:*

Be it known that I, WILLIAM MORRISON, a citizen of the United States, residing at Des Moines, in the county of Polk and State of Iowa, have invented certain new and useful Improvements in Power-Transmission Systems, of which the following is a specification.

My invention relates to a power-transmission system, primarily intended for use on automobiles, the system being of that kind in which power is delivered from the engine shaft to the driven shaft through a dynamo-electric clutch.

It has for its object to simplify the mode of operation of such systems, and particularly of those shown in my prior Patents 1,126,059 and 1,126,060, Jan. 26, 1915.

As described in these patents, the dynamo-electric machine is actuated either (1) as a motor by current from a storage battery, to start the engine, the batteries and the sets of coils in the field magnets being respectively connected in series; or (2) as a generator, the current being generated by the slip between the rotary field magnet and the rotary armature, the batteries and sets of field coils being, in this relation, connected each in multiple, the dynamo acting as an electromagnetic clutch.

The object of the present invention is attained by providing a controller, preferably operated electromagnetically, for properly connecting the dynamo-circuits, which controller is, during the operation of the automobile, controlled by the movements of a throttle lever which admits gas to the engine, the controller requiring, during the running of the automobile, no attention whatever on the part of the operator.

A further object of the invention is to provide a switch mechanism for opening and closing the controller-operating circuits, which switch may be actuated by either the hand-throttle lever on the steering wheel or by a foot-throttle lever or "accelerator" on the floor of the automobile; and has for its further object to provide an additional control for the controller-operating circuits, so that the engine may be run at any desired speed while the controller, and therefore the dynamo-clutch, is out of action.

A further object of the invention is to so arrange the "accelerator" switch, the brake lever, and the auxiliary switch that the operator will have to use the same foot to operate any one of these devices, and mistakes in operation are thereby avoided.

The system is further so designed that the dynamo-electric clutch may be used as a motor for starting the gas-engine, a storage battery being connected to the system for this purpose.

The general object of the invention therefore is to provide a power-transmission system for automobiles by which the automobile can be run at any desired speed by manipulation of the throttle lever, the electrical portion of the device being so connected to the throttle lever that it is automatic in operation and independent of any separate control by the operator.

Further objects of the invention will appear from the specification and claims.

The controller, itself, is not claimed herein, as I have this day filed a separate application therefor.

Referring to the drawings:—Figure 1 is diagram of the system, the controller being shown in perspective, with the magnets omitted; Fig. 2 is a plan of the controller; Fig. 3 is a front view of the controller, looking in the direction of the arrow III in Fig. 2; Fig. 4 is a back view of the controller, looking in the direction of the arrow IV in Fig. 2; Fig. 5 is a horizontal section through the controller on plane V—V of Fig. 4; Fig. 6 is a perspective view of a connecting bar; Fig. 7 is a vertical section on plane VIII—VIII of Fig. 2; and Fig. 8 is a detail showing the lever system by which the hand and foot throttle levers are connected to the admission valve.

The controller comprises a suitable base to which is secured (Fig. 7) a rectangular iron or steel open-ended casing 9, inclosing the coils of two electromagnets M, $M^1$. Formed integrally with the casing is (Fig. 5) a vertical transverse web 8 from which extends laterally in both directions a longitudinal core 7, about which are wound separately the coils of the electromagnets M, $M^1$. To the sides of this casing and insulated therefrom are bolted two sets of fixed connecting bars $c^1$, $c^2$, $c^3$, $c^4$, $c^5$, $c^6$, and $d^1$, $d^2$, $d^3$, $d^4$, $d^5$, $d^6$, one set on each side, the bars having at each end surfaces against which bear brushes carried by the movable members A and B, operated by the magnets M and M', respectively. To binding-posts on the bars $c^1$, $c^2$, $c^3$, $c^4$, $c^5$, $c^6$ are connected the wires $e^1$, $e^2$, $e^3$, $e^4$, $e^5$, $e^6$, and to binding-posts on the bars $d^1$, $d^2$, $d^3$, $d^4$, $d^5$, $d^6$ are connected the wires $f^1$, $f^2$, $f^3$, $f^4$, $f^5$, $f^6$.

The member A (Fig. 4) is made up of conducting plates $A^1$, $A^2$, $A^3$, and the member B (Fig. 3) is made up of conducting bars or plates $B^1$, $B^2$, $B^3$, $B^4$, $B^5$, $B^6$. These plates are fastened to but insulated from the armatures 1, 2, which are secured to the ends of rods 4, 6, (Fig. 7) arranged to slide on the casing 9, and also to the ends of rod 5 passing through an opening in the core 7. Expansion springs 7', 8' surround rods 4 and 6 and bear against the abutment guides 10 and against the armatures. Current from a battery is delivered to magnet coil M through wires 11, 12, secured to angle-bars 27, 27', bolted to the base. Wires 13, 14, also connected respectively to these bars lead to the ends of a resistance coil $r'$. 15 and 16 are wires, connected to bars 47, 47', leading from magnet coil M' to a separate battery, these wires being connected through wires 17, 18 to resistance coil $r^2$.

As shown at the lower right hand of Fig. 2, a carbon contact 24 is secured to the angle bar 27, to which wires 12 and 14 are connected, and a corresponding movable carbon contact 25 is carried on a rod 28 passing through an opening in arm 30, bolted to the movable member B, which by its outward movement breaks the contact at 24, 25, thereby introducing into circuit of magnet coil M, the resistance $r'$. The parts are so timed in operation that the spring 26 keeps the contacts 24, 25, in engagement until near the end of the movement of member B, the full current strength passing through the coil M until the contacts 24, 25 are separated by arm 30 engaging the head 29 of rod 28, the current then being reduced by resistance $r'$ to an amount sufficient to hold the armature 1 in its attracted position, even against the pull of magnet M' on its then distant armature 2, should the controlling circuit of this magnet M' be closed. A similar device is operated by the arm 31, bolted to member A.

Electrically connected (see Fig. 5) to each one of the brushes carried by the members A and B is a carbon contact 19, and slidingly mounted and opposite each one of these contacts 19, is a second contact 20 carried on a rod 21, sliding in a socket 22. A spring 23 keeps the contact 20 normally in outward position, the parts being so arranged that the carbon contacts engage before the leaf-spring brushes engage with the ends of the connecting bar, and remain in contact until after the leaf-spring brushes have broken their contacts. Any sparking, therefore, takes place at the carbon contacts.

The details of construction of one connecting bar $c^6$, and all are alike, are shown in Fig. 7, and will be apparent without further description.

The conductor bars of the controller are made of aluminum, and are die-cast to exact shape. The magnet core and casing are of soft iron or mild steel. The wires are asbestos coated, so that the whole structure is compact, simple, and fireproof.

It will be noted that the various parts are all of simple shape, easily manufactured and easy to assemble.

Referring now to Fig. 1, which is a diagrammatic representation of the system with which the controller is used, the various connections and the operation of the system as a whole will be described. In Fig. 1, the magnets M, M' have been, for clearness, shown apart from the controller. $M^2$ is a gas-engine having secured to its shaft L the armature G, having an internal commutator ring F. Bearing against the inside of this ring are brushes $E^1$, $E^2$, carried on brush-holders $E^3$, $E^4$, secured to the field-magnet structure H, here shown as having two poles, though in practice twelve poles are used, with three brushes for each pole, so that a considerable friction clutching action will result from the centrifugal force due to rotation. The field-magnet is mounted on the driven shaft I, which is connected through suitable transmission gearing I', in the usual way, to the driving axle of the automobile. On the shaft I are four rings $D^1$, $D^2$, $D^3$, $D^4$, to which are connected the dynamo brushes and field-coils. In practice, the field coils are connected in sets, the general method of arrangement being, however, the same as that shown. Brushes $T^1$, $T^2$, $T^3$, $T^4$ take the current from these rings. The throttle valve $n$ is actuated either from a foot pedal O, or from a hand lever P mounted on the steering-wheel of the automobile. The foot pedal O'' is pivoted at O and has an arm 50 connected, by a link 51, to a crank arm on the rock shaft 52. A second crank arm 53 is connected by a link 54 to the operating lever of the admission valve $n$, O' being a retracting spring. The hand lever P is mounted on the end of a shaft extending through the steering-pedestal, which shaft has at its end a crank arm 61 connected by a link 60 to the crank arm 59 on a rock shaft 58 which has at its other end a crank arm 57 connected by a flexible cable 56 to a crank arm 55 on the rock shaft 52. The retracting spring $O^1$ restores the parts, in the usual way, to the normal position in which the admission valve $n$ is kept slightly open, to keep the engine running. The hand lever is provided with the usual friction means for keeping it in its adjusted position while the foot pedal, when the hand lever P is in the off position, may be independently operated. In practice, the hand lever P is seldom used except during the engine-starting operations, the foot pedal mainly being used during the running of the car. Q is a spring blade on the end of the arm 50 for bridging the long contacts R, S, which are long enough to remain in contact with the blade Q in all the wider open positions of the admission valve. The blade Q is arranged to make and maintain connection between these contacts during the movement of the throttle levers but to break this connection in the most retracted or minimum-gas position.

To facilitate the starting of the engine, the additional switch V is provided in the circuit of the magnet M, and until this switch is closed, this magnet cannot be energized to connect the circuits into the running position. The switch V has a body of insulated material $v$, with a notched portion having a conducting strip $v^1$ with which are arranged to engage two spring terminals $v^2$, $v^3$. When the body $v$ is pushed down, these springs $v^2$, $v^3$ bear against insulation; when the body $v$ is pulled up, contact is made through strip $v^1$.

The operation of starting the engine is as follows: Assuming that the automobile is at rest with the brake applied to prevent the car from moving, either one of the throttles, preferably the hand-throttle P, is opened to deliver gas to the engine in quantity sufficient to start it. The switch 32 is then closed, thereby causing current to flow from the battery $C^2$ (though of course a separate battery might be used) through the coil of magnet M′, which pulls up its armature and the member B carried thereby. The circuits thus made are as follows: from positive terminal of battery C′ through wire $e^3$, bar $c^3$, brush $k^3$, plate $B^2$, brush $k^2$, bar $c^2$, wire $e^2$, brush T′, collector ring D′, brushes E′, coil H′, ring $D^2$, brush $T^2$, wire $f^1$, bar $d^1$, brush $g^1$, bar B′, brush $k^1$, bar $c^1$, wire $e^1$, brush $T^3$, ring $D^3$, coil $H^2$, brushes $E^2$, ring $D^4$, brush $T^4$, wire $f^2$, bar $d^2$, brush $g^2$, plate $B^3$, brush $g^3$, bar $d^3$, wire $f^3$, to negative end of battery $C^4$, thence from positive end of battery $C^4$ through wire $e^6$, bar $c^6$, brush $k^6$, bar $B^6$, brush $g^6$, bar $d^6$, wire $f^6$, to negative end of battery $C^3$, and so on until the negative end of battery C′ is reached. At the same time, the armature has been connected in circuit at brushes E′, $E^2$, so that the dynamo acting as a shunt-wound motor starts the engine. Thereupon the switch 32 is opened, breaking the starting circuit and deënergizing the magnet M′. The spring S′ then restores the parts of the controller to the neutral position shown in Fig. 2. With the engine running, the hand-throttle is turned back to the minimum gas position in which, while the gas admission valve is open, enough to keep the engine running, the contacts R, S are not bridged. The switch V, which up to this time has been open, is then closed and the throttle lever moved to further open the throttle valve. This further movement of the throttle lever causes the blade Q to bridge the contacts R, S, and as the switch V is now closed, the circuit to the magnet M is completed. The magnet M now pulls up its armature and with it the multiple member A, thereby connecting the dynamo and battery circuits in multiple. The circuits now closed may be traced from (positive pole) brushes E′, through coil H′, ring $D^2$, brush $T^2$, wire $f^1$, brush $i^1$, plate $A^2$, brush $i^2$, wire $f^2$, brush $T^4$, ring $D^4$, to brushes $E^2$. A second circuit in parallel to that just described goes from brush T′, wire $e^2$, brush $h^2$, plate $A^3$, brush $h^1$, wire $e^1$, brush $T^3$, ring $D^3$, coil $H^2$, to brushes $E^2$. At the same time all the negative poles of the batteries have been connected through their wires $f^3$, $f^4$, $f^5$, $f^6$, and brushes $i^3$, $i^4$, $i^5$, $i^6$, to plate $A^2$, and the positive ends of the batteries have been connected through wires $e^3$, $e^4$, $e^5$, $e^6$, and brushes $h^3$, $h^4$, $h^5$, $h^6$, with plate A′. In order that the batteries may be disconnected, if desired, the plates A′ and $A^3$ are insulated from each other, but wires $e^2$ and $e^3$ are connected by wires $m^2$, $m^3$ through a switch $s$.

In case it is desired to use the dynamo, without the storage batteries, the switch "$s$" is opened, thereby disconnecting the batteries. The controller will then operate to close the dynamo-circuits only, the dynamo then operating as a self-exciting clutch. In this position of the controller, the field coils are connected in multiple, and the batteries are also in multiple, both coils and batteries being in shunt to the armature. The dynamo is now in position to act as a clutching generator, and to generate current because of the slip between the armature and field-magnet.

The foot pedal O is arranged as shown near the foot of the steering-wheel pedestal in position to be conveniently operated by the right foot of the operator. The brake lever pedal (not shown) and switch V are arranged still farther to the right but still within reach of the operator's right foot. The result of this arrangement is that the operator cannot apply the brake without removing his foot from the foot pedal O, which on being released, automatically operates the controller to break the circuits and then destroy the magnetic clutching action of the dynamo. Nor can the operator pull up the switch V, which is most conveniently done with the toe of the right foot, without lifting his foot from the foot throttle, which immediately and automatically cuts off the gas to the minimum point. When the switch V has been closed, the foot throttle is operated to complete the connections to the controller and the dynamo is put into action at a safe engine-speed. The liabilty of sparking at the commutator caused by a closing of the switch V with the engine at high speed, is thereby largely obviated.

After the car has been started, the operator controls the speed entirely by opening and closing the throttle, the acceleration and retardation being effected by simple manipulation of the throttle lever in the usual way. As the contacts R, S are bridged by the blade Q in all the wider open positions of either throttle, the operation of the controller is automatic. Thus if the automobile be running at high speed and the throttle be shut off to lower the speed of the engine, the controller will be automatically operated to break the dynamo circuits while, when the gas is again turned on, the throttle lever will close the controller circuit and the dynamo circuits will again be brought into operative position. When the automobile is running by its own momentum, as for instance when going down hill, with the gas cut off, the only connection between the driving and the driven shafts is that afforded by the centrifugally produced friction of the brushes on the commutator rings. This frictional engagement tends to rotate the engine against the compression, and cause it to act as a compressor brake, thereby affording a very flexible but efficient braking action, and the greater the speed the greater the braking action thus produced.

It will be understood that my invention is applied to gas-engine driven automobiles, equipped in the usual way, the power being transmitted from the driven shaft to the driving axle through variable transmission gearing. My dynamo-electric clutch takes the place of the fly-wheel, and acts simply as a means for transmitting to the driven shaft all the power developed by the engine, except the small amount of power required to produce the electrical energy used in the clutch.

I claim:

1. A power transmission system, comprising a variable speed engine, a driving shaft connected to the engine and a driven shaft connected to the load, a dynamo-electric clutch comprising a rotatable armature and a rotatable field magnet, one connected to the driving shaft and the other to the driven shaft, a circuit controller for the dynamo circuits, and coördinated means for controlling the gas-supply to the engine and for operating the controller.

2. A power transmission system, comprising a variable speed engine, a driving shaft connected to the engine and a driven shaft connected to the load, a dynamo-electric clutch comprising a rotatable armature and a rotatable field magnet, one connected to the driving shaft and the other to the driven shaft, a circuit controller for the dynamo circuits, and coördinated means arranged to simultaneously supply gas to the engine and operate the controller.

3. A power transmission system, comprising a variable speed engine, a driving shaft connected to the engine and a driven shaft connected to the load, a dynamo-electric clutch comprising a rotatable armature and a rotatable field magnet, one connected to the driving shaft and the other to the driven shaft, a circuit controller for the dynamo circuits, and coördinated means arranged to simultaneously supply gas to the engine and operate the controller, said gas-supplying means arranged to thereafter control, as desired, the speed of the engine and thereby control the power transmitted to the driven shaft through the clutch.

4. A power transmission system comprising a variable speed engine, a driving shaft connected to the engine and a driven shaft connected to the load, a dynamo-electric clutch comprising a rotatable armature and a rotatable field magnet, one connected to the driving shaft and the other to the driven shaft, a circuit controller for the dynamo circuits, a throttle lever for controlling the supply of gas to the engine, and means connected to said lever for operating the controller.

5. A power transmission system comprising a variable speed engine, a driving shaft connected to the engine and a driven shaft connected to the load, a dynamo electric clutch comprising a rotatable armature and a rotatable field magnet, one connected to the driving shaft and the other to the driven shaft, a storage battery comprising a plurality of cell units, a circuit controller constructed and arranged to connect the field coils and cell units in multiple relation, a throttle lever for controlling the supply of gas to the engine, and means connected to said lever for operating the controller.

6. A power transmission system comprising a variable speed engine, a driving shaft connected to the engine and a driven shaft connected to the load, a dynamo-electric clutch comprising a rotatable armature and a rotatable field magnet, one connected to the driving shaft and the other to the driven shaft, an electromagnetically actuated circuit controller for the dynamo circuits, a throttle lever for controlling the supply of gas to the engine, and a switch connected to said lever to open and close the controller circuit.

7. A power transmission system, comprising a variable speed engine, a driving shaft connected to the engine and a driven shaft connected to the load, a dynamo-electric clutch comprising a rotatable armature and a rotatable field magnet, one connected to the driving shaft and the other to the driven shaft, an electromagnetically actuated circuit controller for the dynamo circuits, a throttle lever for controlling the supply of gas to the engine, a switch connected to said lever to open and close the controller circuit, and a second switch in said controller circuit.

8. A power transmission system, comprising a variable speed engine, a driving shaft connected to the engine and a driven shaft connected to the load, a dynamo-electric clutch comprising a rotatable armature and a rotatable field magnet, one connected to the driving shaft and the other to the driven shaft, a circuit controller constructed and arranged to control the dynamo circuits, a valve for supplying gas to the engine, a hand throttle lever flexibly connected to the valve, a spring-retracted foot throttle lever positively connected to said valve, and controller operating means arranged to be operated by either lever.

9. A power transmission system, comprising a variable speed engine, a driving shaft connected to the engine and a driven shaft connected to the load, a dynamo-electric clutch comprising a rotatable armature and a rotatable field magnet, one connected to the driving shaft and the other to the driven shaft, an electromagnetically actuated circuit controller for the dynamo circuits, a foot throttle lever for controlling the supply of gas to the engine, a switch connected to said lever to open and close the controller circuit, and a second switch in said controller circuit, the foot throttle lever and the second switch being sufficiently far apart to require separate actuation.

10. A power transmission system comprising a variable speed engine, a driving shaft connected thereto, a driven load shaft and a dynamo electric clutch whereof the rotatable field and rotatable armature are connected one to said driving shaft and one to said driven shaft, one of said rotors having movably connected thereto parts adapted to actuated by centrifugal force, and the other rotor having a member with which said parts are adapted slidingly to engage, said parts being so proportioned that the centrifugally produced friction between said parts and member when in engagement produces a clutching action, and means for breaking the dynamo-circuits, whereby, when said circuits are broken while the automobile is running, the said clutching action will cause the engine to act as a compressor brake.

11. A power transmission system for automobiles comprising a variable speed gas-engine, a driving shaft connected to the engine, a driven shaft connected to the load, a dynamo electric clutch comprising a rotatable armature and a field magnet rotatable within said armature, one connected to the driving shaft and one to the driven shaft, a commutator ring, brushes on the field magnet bearing outwardly against the commutator ring, the brushes being so proportioned that the centrifugally produced pressure will effect a clutching action, and means for breaking the dynamo circuits, whereby, when the said circuits are broken, while the automobile is running, the said clutching action will cause the engine to act as a compressor brake.

In testimony whereof I affix my signature in presence of two witnesses.

WILLIAM MORRISON.

Witnesses:
   JOSEPH W. HARRIS,
   J. H. BRICKENSTEIN.

Copies of this patent may be obtained for five cents each, by addressing the "Commissioner of Patents, Washington, D. C."